United States Patent [19]
Otto et al.

[11] Patent Number: 5,118,206
[45] Date of Patent: Jun. 2, 1992

[54] CONE BORE SEAL

[76] Inventors: Dennis L. Otto, 72 W. Mohawk Dr., Malvern, Ohio 44644; Raj B. Seth, 6661 Hythe NW., Canton, Ohio 44708

[21] Appl. No.: 685,039

[22] Filed: Apr. 15, 1991

[51] Int. Cl.⁵ ............................................. F16C 33/76
[52] U.S. Cl. .................................. 384/477; 384/484; 384/506
[58] Field of Search ............... 384/477, 484, 485, 486, 384/487, 499, 501, 504–506, 571; 277/174, 152

[56] References Cited

U.S. PATENT DOCUMENTS

| | | | |
|---|---|---|---|
| 3,958,847 | 5/1976 | Cain et al. | 384/504 |
| 3,986,754 | 10/1976 | Torrant | 384/504 |
| 4,692,040 | 9/1987 | Ebaugh et al. | 384/484 |
| 4,997,294 | 3/1991 | Hillmann | 384/477 X |

*Primary Examiner*—Thomas R. Hannon
*Attorney, Agent, or Firm*—Polster, Lieder, Woodruff & Lucchesi

[57] ABSTRACT

A multirow bearing assembly for the roll neck of a working rolling mill in which the bearing is composed of rolling elements between outer and inner members in which the inner members are positioned in axial endwise abutment and are formed with undercut counterbore formations facings the roll neck. The bearing assembly includes sealing components operative in the counterbore cavity formations to exclude water and contaminants getting into the endwise abutment of the inner members. In addition, the sealing components include one or more devices to adjust the effect of the wear on the seal in the event that water and contaminants get into the sealing components.

9 Claims, 1 Drawing Sheet

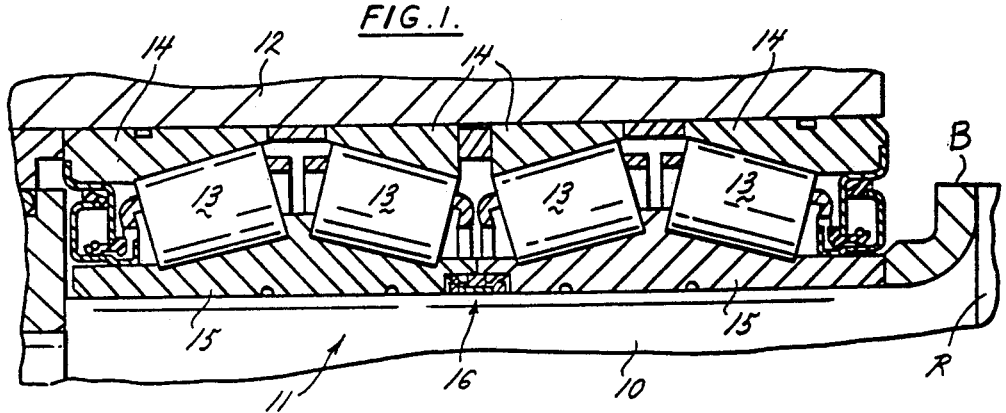
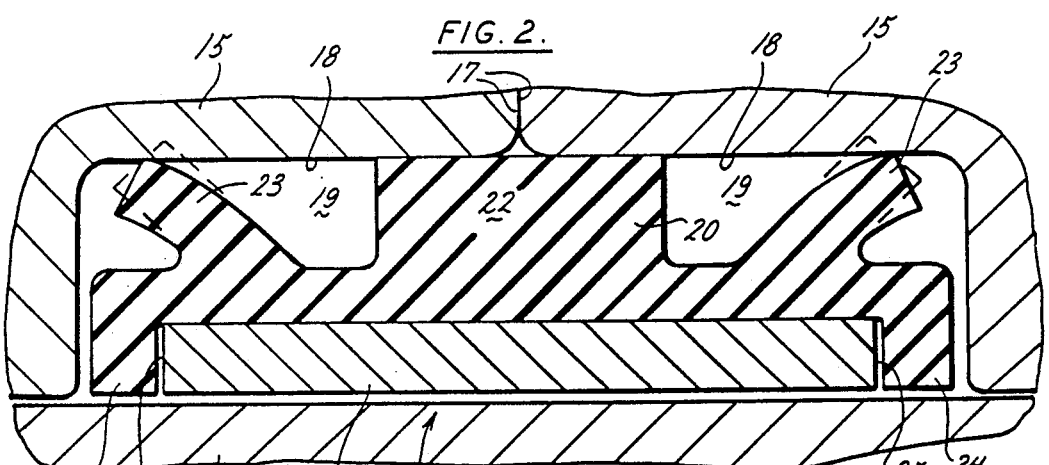
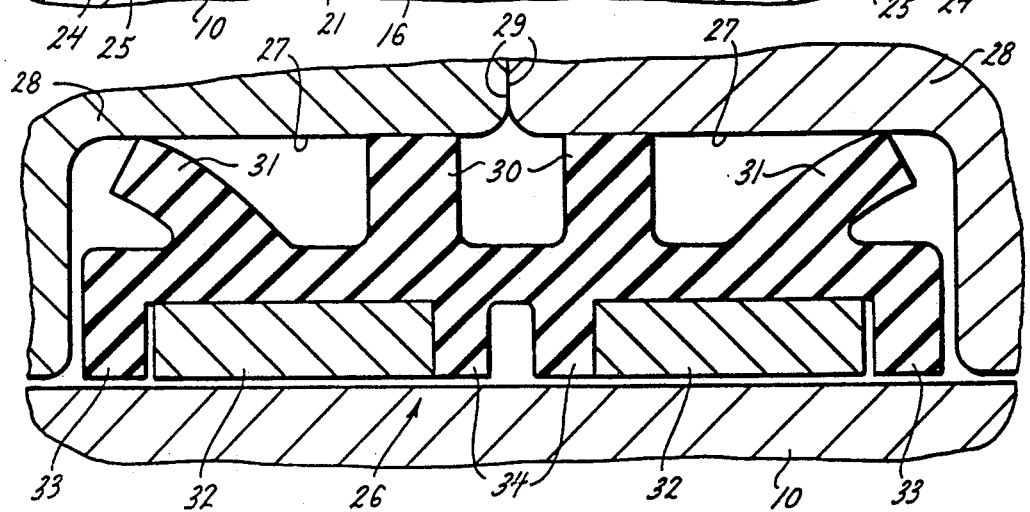

CONE BORE SEAL

BACKGROUND OF THE INVENTION

1. Field of the Invention

This invention is concerned with cone bore seals to prevent ingress of contaminants and water to the cone faces during separation of the cone faces in service.

2. Description of the Prior Art

The bearing on which work rolls of rolling mills turn are subjected to hostile environments in which the bearings are called upon to sustain heavy radial loads exerted by the passage of components which require shaping by the rolls supported on bearings carrying the roll necks in supporting chocks. The forming process subjects the rolls to high pressures and impacts as the chocks in which the bearings are housed yield to radial and axial displacement. Such bearings require seals which exclude contaminants while the displacement occurs in the bearing assembly.

The problem of excluding contaminants has been attacked in many ways such as by T-shaped spacers between the bearing cones of adjacent bearing assemblies. Such seals do not effectively exclude water which is used to control bearing heat. During operation of the mill rolls, the bearing cone faces tend to separate due to changes in the direction of the thrust loads, thereby allowing water and water born contaminants to enter. This results in wear of the cone faces which permits drastic water and contaminant ingress to the bearing assembly.

This problem of the foregoing character has been addressed by bearing manufacturers in respect of protecting bearings in work or back-up rolls of a rolling mill. One example is seen in the Ebaugh et al U.S. Pat. No. 4,692,040 of Sept. 8, 1987 which illustrates a sealing arrangement used where the inner end faces of the inner races abut one another. However, none of the several designs shown in this patent cope effectively with the cone face separation which occurs in service.

BRIEF DESCRIPTION OF THE INVENTION

The new and improved cone bearing seal embodies an arrangement of components to prevent ingress of water and contaminants to the cone faces during separation of those end faces. The new arrangement presents sealing lips operating in counterbores in the respective cones of multirow bearings.

The object of this invention is to present each sealing lip with an interference fit in the counterbore which is determined by the imposition of a seal positioning pad between the sealing lips so the seals are expanded radially outward to force the seals against the counterbore internal diameter of both inner raceway support members.

Another object is to direct the sealing lips to prevent water and contaminant ingress into the void between the sealing lips and if water and contaminants do enter the void seal positioning pad means acts as a secondary seal to prevent such ingress.

Still another object is to have the bearing seals, if water and contaminants do enter the void, wear on the outer diameter of the secondary seal which results in increasing the interference fit of the seal to resist further ingress of water and contaminants.

BRIEF DESCRIPTION OF THE DRAWINGS

The cone bore seal of this invention is illustrated in the following drawing views:

FIG. 1 is a fragmentary sectional view of so much of the bearing for supporting a roll neck of a rolling mill thought to present the environment of the invention;

FIG. 2 is an enlarged and fragmentary detail of the axial under cut for receiving the sealing means of the invention; and FIG. 3 is a modified sealing means for the environment illustrated in FIG. 2.

DETAILED DESCRIPTION

In the view of FIG. 1, the roll R in a rolling mill (not shown) is formed with a roll neck 10 which is supported for rotation in a bearing assembly 11 of a type partly seen in section carried in a roll neck housing 12. The bearing assembly is typically a multi-roller assembly having the rolling elements 13 operatively positioned between outer members which are in the form of cups 14 and inner members in the form of a cone 15. However, the bearing assembly may have other inner and outer raceway members to support rolling elements. It can be seen that the respective inner raceway supports 15 are arranged so that they are paired with each other in abutment and each abutting pair is provided with a common seal assembly 16. In this instance, there is a backing ring B at the radius between the roll R and the neck 10.

Turning now to FIG. 2, there is shown in fragmentary and enlarged detail a typical axial bore seal assembly 16 which possesses the following characteristics. A pair of axially directed inner members 15 are each axially undercut to present a counterbore 18 to the roll neck shaft 10. In this view, the members 15 have end faces 17 in axial abutment in the central space formed by the cooperating bores 18 for the reception of an elastomeric sealing element 20 pressed into sealing position by a metallic snap ring 21 loosely mounted on the roll neck 10. The seal assembly 16 functions in the following manner to prevent access of water and contaminants to the abutting faces 17 of the members 15.

The seal element 20 is formed with a pad 22 which spans the joint between the abutting end faces 17. The pad 22 is flanked on each side by a sealing lip 23 and the pad 22 is retained in operating positions by the formation of opposite end flanges 24 which embrace the sides 25 of the ring 21. This seal assembly 16 is operative to prevent water and contaminants having access to the end faces 17 during separation of those end faces 17. The sealing lips 23 operate on the surface of the counterbore 18 to have an interference fit which is determined by the pad 22 between the lips 23. The seal body 20 is expanded radially outwardly by the snap ring 21 which acts as a spring to force the seal positioning pad 22 against the counterbore 18 of both raceway supports 15. The larger radial dimension of the sealing lips 23 relative to the radial dimension of the pad 22, when the seal is in the free state, forces the sealing lips 23 to flex into an interference fit with the counterbores 18. The outwardly directed angular position of the sealing lips 23 acts to prevent water and contaminant ingress to the void or space between the lips 23 and the pad 22.

An important feature of the improvement, in addition to the foregoing, is that if water and contaminants enter the voids 19 on one or on each side of the pad 22, the wear induced on the pad thereby will occur on the outer surface of the pad 22 which results in the ring 21 expanding radially outwardly because of the wear, thereby increasing the pressure of the seal lips 23 on the counterbore surfaces 18 which increases the interference fit of these seals. That increase in the fit of the seal lips 23 improves the ability of the seals to exclude the water and contaminants.

A continuing problem in maintaining a proper seal in the bearings for supporting the roll neck in a severe hot mill is related to the multiple row roller bearings where the inner members of the bearings undergo periodic axial separation from a desired position of abutment. When the inner members separate, water and contaminants enter the bearing because in a hot mill water is used to cool the roll neck bearings. The entry of the water and all of the contaminants that it may bring developes wear of the inner members. Attempts have been made to mount a seal unit between the inner members and rely on that seal to exclude water and contaminants. One attempt to overcome the problem is seen in U.S. Pat. No. 4,692,040 before noted. It is believed that the improved seal arrangement herein shown and claimed provides the proper answer as the improvement herein continues to maintain an effective seal as wear occurs. Wear compensation is an important feature of the bearing as it overcomes the expense of dismantling the mill bearings to replace a seal that does not have any means to compensate for wear.

A modified bearing seal assembly 26 is seen in FIG. 3 is mounted in the undercut bores 27 in the inner members 28. The inner bearing members 28 are in axial abutment at the adjacent ends 29. The abutting ends 29 require protection from water and contaminants that can be brought in when the ends 29 separate during operation of the mill roll R. The seal assembly 26 in this arrangement is formed with duplicate seal pads 30 positioned on opposite sides of the zone of abutment of the ends 29 and each seal pad 30 is associated with a flexible seal lip 31 abutting the undercut surfaces 27 to exclude contaminants and water from the seal pads 30.

Since there are a pair of pads 30, each such pad is radially pressed against the undercut surface 27 by a snap ring 32 loosely mounted on the roll neck 10. These rings 32 serve to retain the pads 30 in proper position by furnishing a locating function where each is embraced by depending flanges 33 adjacent the respective lip seals 31, and by centering flanges 34 between the rings 32.

The foregoing specification has set forth certain forms of the improved seal means excluding water and contaminants from between the inner members of roller bearings that are subjected to relative movement while in abutment. The object is to retard wear as much as possible. The principles of the subject improvements may suggest other forms which fall within the scope of this disclosure.

What is claimed is:

1. In a bearing assembly for a mill roll neck having rolling elements operating between inner and outer members in raceways in such members, the improvement in that bearing assembly for excluding contaminants therefrom which comprises:
   (a) inner members on the roll neck positioned to be in axial abutment with each other;
   (b) each inner member being formed with an undercut bore extending axially along the roll neck for a distance away from the point of abutment;
   (c) a seal device disposed in said undercut bores in said inner members, said seal device having a first seal bridging the point of abutment of said inner members, and other sealing elements positioned one in each of said undercut bores; and
   (d) means mounted on the roll neck in position to retain said first seal in position bridging said point of abutment of said inner members to exclude contaminants from entering between said point of abutment of said inner members, said retainer means being loosely positioned on the roll neck opposite the point of abutment of said inner members, and said seal device including means embracing said retainer means for holding said other sealing elements and said first seal in said undercut bores in contaminant excluding positions in the bearing assembly.

2. The improvement set forth in claim 1 wherein said other sealing elements are comprised of a lip seal in each of said undercut bores to form first barriers against contaminants reaching said first seal.

3. The improvement set forth in claim 2 wherein said lip seals are resilient for maintaining sealing contact on said undercut bores in each of said inner members.

4. In a bearing assembly for supporting the roll neck of a mill roll between inner and outer support members having rolling elements between the support members, the improvement in the bearing assembly comprising:
   (a) inner members on the roll neck extending into position of abutment and said inner members being formed into undercut bores extending axially at each side of the position of abutment;
   (b) contaminant excluding sealing device operatively mounted in said axially extending undercut bores and being formed with a first seal element having a surface bridging the abutting position of said inner members, and sealing lip elements at each side of said first seal element in position to engage a surface of said undercut bores, said first seal element and each of said sealing lip elements extend radially outward from the roll neck to engage the undercut bore surfaces; and
   (c) spring means positioned on the roll neck opposite the position of abutment of said undercut bores, said spring means holding said first seal element with said surface in sealing engagement bridging the abutting position of said inner members, and causing said sealing lip elements to flex upon engaging a surface of said undercut bores.

5. The improvement set forth in claim 4 wherein said sealing device is formed with flanges for embracing said spring means whereby said first seal element is held in position bridging the abutting ends of said inner members.

6. The improvement set forth in claim 4 wherein said spring means is effective to expand said first seal element radially outwardly as wear occurs to said first seal element to maintain sealing engagement, and said spring means presses said sealing lip elements into said undercut bore to compensate for wear of said first seal element.

7. A bearing assembly for supporting a rotary shaft and comprising:
   (a) a roller bearing assembly having inner members positioned on the rotary shaft and in axial end abutment, said inner members having counterbores extending axially along the rotary shaft from the abutting ends of said inner members;
   (b) seal means positioned in said counterbores and formed with elements engaging said counterbores to exclude contaminants from said abutting ends of said inner members, said seal means including seal forming elements spaced apart at each side of the abutting ends of said inner members; and (c) pressure exerting means on the rotary shaft in position to engage said seal means and exert a radially directed force on said seal means to compensate for wear in said seal means.

8. The bearing assembly set forth in claim 7 wherein said seal means is a single element positioned between said seal forming elements for effectively bridging said abutting ends of said inner members.

9. The bearing assembly set forth in claim 7 wherein said seal means presents a sealing pad on each side of the abutment between said inner members, and other seals in said counterbores in axially spaced relation from said sealing pads.

* * * * *

UNITED STATES PATENT AND TRADEMARK OFFICE
CERTIFICATE OF CORRECTION

PATENT NO. : 5,118,206
DATED : June 2, 1992
INVENTOR(S) : Dennis L. Otto and Raj B. Seth It is certified that error appears in the above-identified patent and that said Letters Patent is hereby corrected as shown below:

```
Column 4, line 29, "into" should be
--- with ---
```

Signed and Sealed this

Sixth Day of July, 1993

Attest:

MICHAEL K. KIRK

*Attesting Officer*     *Acting Commissioner of Patents and Trademarks*